Oct. 6, 1931.  W. SCHWERDTFEGER  1,826,638
INTERNAL COMBUSTION ENGINE AND METHOD OF WORKING THE SAME
Original Filed Aug. 30, 1921

INVENTOR:
Walter Schwerdtfeger

Patented Oct. 6, 1931

1,826,638

UNITED STATES PATENT OFFICE

WALTER SCHWERDTFEGER, OF UNTERTURKHEIM, WURTTEMBERG, GERMANY, ASSIGNOR TO DAIMLER-MOTOREN-GESELLSCHAFT, OF UNTERTURKHEIM, GERMANY

INTERNAL COMBUSTION ENGINE AND METHOD OF WORKING THE SAME

Application filed August 30, 1921, Serial No. 496,920½, and in Germany November 14, 1919. Renewed June 6, 1928.

This invention comprises improvements in and connected with internal combustion engines and the method of working the same. It is known that the output of these engines obtained with normal suction, can be increased by supplying pre-compressed air or mixture. The permissible degree of pre-compression depends upon various considerations, as for example, the nature of the combustible, the self-ignition pressure, the design of the engine, and the method of working, that is to say whether by explosion or by combustion as in a Diesel engine. The adjustment of the degree of pre-compression to suit particular running conditions can be effected in a comparatively simple manner when a piston compressor is used or by changing the speed of a blower fitted with auxiliary driving gear. Difficulty is encountered however, when a compressor of the type in which the output is disproportional to the speed is connected with the engine to be driven with a proportional speed, as, in this case, the output of the blower falls disproportionately whereby the degree of pre-compression tends to vary with the number of revolutions per minute. Blowers having no packing and working solely by the fitting of the parts one against another represent compressors of such type and the instant invention primarily contemplates the use of such a blower.

The object of the present invention is to enable the desired increased or maximum output corresponding with any speed to be obtained from the engine over the whole range of speed of which the engine is capable.

According to this invention, the said object is achieved by uniformly maintaining a constant difference between the pre-compression which corresponds with the maximum or increased compression under which the engine is to run and the atmospheric pressure surrounding the engine. The invention is based on the realization that for any particular engine a degree of pre-compression can be computed which can be suitably maintained for all working conditions or speeds in order that the greatest or desired output may be obtained at all speeds. If the pressure of the air delivered to the engine is maintained constant for all speeds of the engine under a degree of pre-compression which corresponds with the maximum compression pressure at which the engine is designed to run, it follows, therefore, that the torque delivered by the engine will be constant for all speeds, that is to say every stroke or explosion of the engine will produce the same power effect for a given setting of the throttle, because there will be delivered to the cylinder an equal weight of air or mixture irrespective of the speed at any particular instant. Hence the invention is particularly applicable to internal combustion engines of the type capable of being subjected at various speeds to the same load, the latter corresponding to the aforementioned constant torque.

If a blower directly connected with the engine is employed, the delivery or, in other words, the theoretical output or stroke volume of the blower is calculated so that at any instant it is greater than is necessary for the development of the maximum or pre-determined increased output of the engine at the speed of running at that instant. In other words, the blower or compressor is so dimensioned that the volume which would be delivered in one revolution, were the compressor absolutely tight and free from leakage, i. e. the theoretical output per revolution, is so much greater than the stroke volume of the engine that at all speeds, throughout the interval between the minimum and maximum speed, the effective output will be sufficient to maintain the charge delivered to the engine under a pressure not lower than the predetermined limit which, as heretofore stated, surmounts the atmospheric pressure by a certain constant invariable degree. In order to obviate a falling off or an excessive increase of the pre-determined pre-compression pressure which could be expected at certain speeds from the disproportional output, the invention provides for regulating the said pressure by maintaining a constant difference between said pressure and the atmospheric pressure surrounding the engine. For example, the pre-compression pressure may be regulated by means of a throttle arranged in the suction pipe of the blower and placed under the control of a device, such as a diaphragm, or aneroid device or the like, sensitive to pressure differences or by means of any other regulating valve mechanism associated with the blower to vary the delivery thereof. This device may be subjected on the one hand to the pressure in the delivery pipe from the blower to the engine, and, on the other hand, to atmospheric pressure whereby the pre-compression pressure is maintained uniform or constant provided that the atmospheric pressure does not change. The regulating means may be introduced into the delivery pipe of the blower and may consist of a spring-loaded bye-pass valve controlling a bye-pass shunted across the blower, in which case the suction pipe of the blower would preferably be fitted with an automatic suction valve.

It has been mentioned that the pre-compression pressure is kept constant provided that the atmospheric pressure does not change. Under ordinary working conditions, however, the atmospheric pressure is substantially constant. It is therefore sufficient for the purposes of the invention to keep the pressure difference between the atmosphere and the pre-compression pressure constant. In this respect, the invention differs from known regulating devices for air-craft engines, which maintain the absolute amount of the pre-compression pressure, and, to this end, always utilize collapsible sealed hollow members responsive to changes of the surrounding pressure. The use of such members is objectionable because they are subjected to disturbances caused by variations of temperature. This invention does away with such unreliable elements by providing regulating means counteracting any change of the pressure difference between the atmosphere and the pre-compression pressure.

The resulting lack of independence from variations in the surrounding atmospheric pressure does in no way mean any material disadvantage because engines of the type capable of being subjected to the same load at various speeds for which the invention is primarily designed as afore-mentioned, do not include aircraft engines of the customary construction which are the only type of engines in which independence from the atmosphere is desirable. Aircraft engines are usually in driving connection with a propeller imposing upon the engine a load which increases with the speed. A certain load, therefore, can only occur at a certain corresponding speed and never at various speeds. Hence it is impossible for an ordinary aircraft engine to produce the same maximum torque at various speeds. An engine of such characteristics, however, is the primary object of the present invention. It may be mentioned that engines capable of delivering the same torque or, in other words, of being subjected to the same load, at various speeds include automobile engines. These engines, however, are not likely to be affected by changes in the pressure of the surrounding atmosphere.

In order to enable the invention to be readily understood reference is made to the accompanying drawings, in which:—

Figure 1:
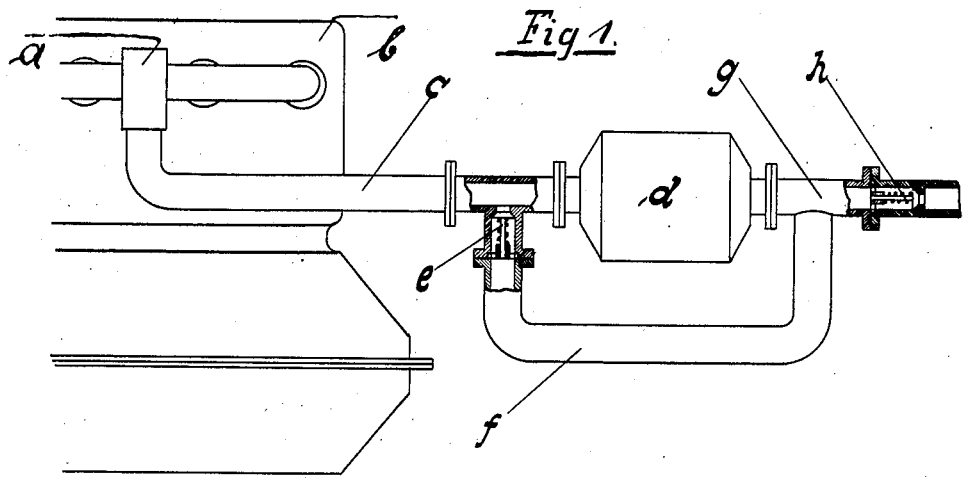
Figure 1 is a more or less diagrammatic representation, in side elevation, of an internal combustion engine fitted with a blower and automatically controlled bye-pass arrangement in accordance with this invention.

In the drawings, $a$ is the carburetter, $b$ is the internal combustion engine, and $c$ is an air supply pipe connecting the blower $d$ and the carburetter $a$ which is arranged in the customary manner to communicate with all inlet valves of the engine. The blower $d$ is arranged in driving connection with the engine whereby it is rotated at a speed proportional to the speed of rotation of the engine at any time.

In the arrangement seen in Figure 1, there is a poppet valve $e$ which is loaded with suitable resilient means, such as a spring, tending to keep the poppet valve closed against the pressure prevailing in the delivery pipe. The poppet valve $e$ controls the communication between the delivery pipe $c$ and the suction pipe $g$ of the blower $d$ by way of the bye pass pipe $f$ shunted across the blower. Also, there is an automatic suction valve formed by a second poppet valve $h$ inserted in the suction conduit $g$ through which valve $h$ the air passes from the atmosphere to the blower $d$.

In this arrangement the operation is as follows: The loading of the valve $e$ is suitably adjusted to suit the desired degree of pre-compression so that, during the running of the engine, if this pressure should exceed the pressure prevailing in pipe $f$ by more than a predetermined degree depending on the adjustment of the valve spring, the valve $e$ will open and excess air will flow through the pipe $f$ back into the suction pipe $g$ thereby maintaining a constant difference of pressure between the pre-compression pressure in pipe $c$ and the pressure prevailing in pipe $f$. As the latter is kept, through a similar action of valve $h$, at a degree also differing by a certain amount from the surrounding atmospheric pressure, it follows that a constant difference is maintained between the pre-compression pressure in pipe $c$ and the atmospheric pressure. Owing to this idle circulation, or bye-passing of air the valve $h$ will adjust itself to suit the altered intake from the atmosphere and so long as the pressure in the pipes $f$ and $g$ is greater than the pressure of the atmosphere the suction valve will remain closed. Instead of the valves $e$ and $h$, any other suitable regulating or controlling means may be employed, such as, for example, slide valves, cocks or the like.

Instead of by-passing the charge, as in Fig. 1, the output of the blower may be regulated by controlling the amount of air or mixture sucked by the blower. According to the arrangement seen in Figure 2, a throttle valve $i$ is fitted in the suction pipe $g$ and is placed under the control of a diaphragm $k$. For example, the valve $i$ may be fitted with a toothed wheel $m$ operated by a rack $n$ connected with the diaphragm. The lower side of the diaphragm $k$ is subjected to atmospheric pressure while the upper side is subjected to the pressure of delivery of the blower $d$ by means of the connecting pipe $l$. This controlling device is regulated by adjusting the loading of the diaphragm due to the spring $o$.

Figure 2:
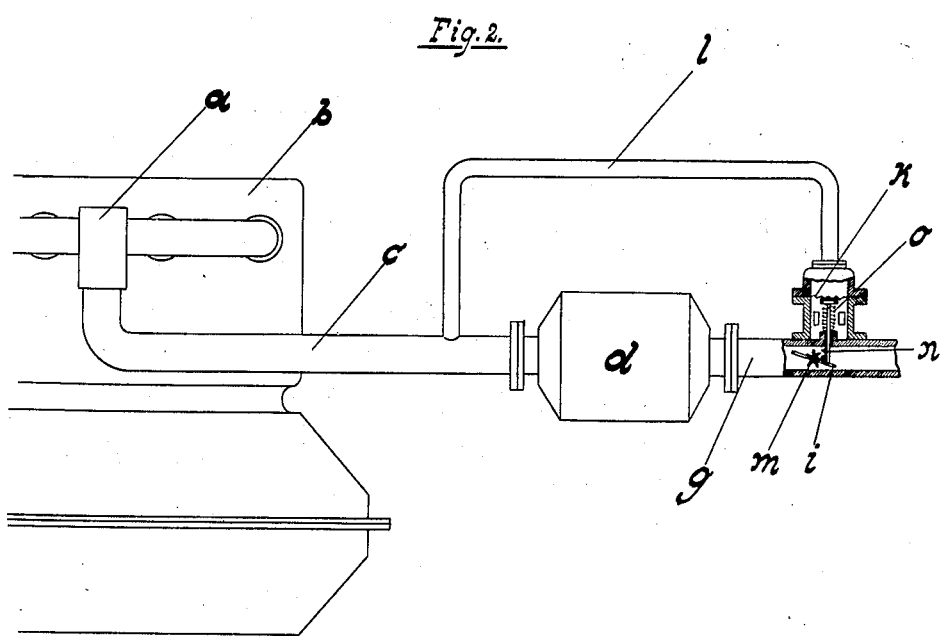
Figure 2 is a similar view of an engine fitted with a blower the suction of which is automatically controlled by means of another pressure-responsive device, subjected to the delivery pressure of the blower and to the influence of the surrounding atmosphere.

In the operation of the arrangement seen in Figure 2, the parts are set or adjusted so that upon increase of pressure taking place in the delivery pipe $c$ the throttle valve $i$ is turned towards the closed position, and upon decrease of pressure taking place in the delivery pipe $c$ the throttle $i$ is opened, and in this manner the output of the blower is adjusted to suit the consumption at any instant and the difference of pressure between that existing in the delivery pipe $c$ and the atmosphere is kept constant.

The blower is preferably of the type in which the working parts are not packed or closely fitted one against another but are designed so that there are spaces between them at any point of a revolution. A Roots blower with spaces between the vanes or pistons and between the latter and the casing, at every point in a revolution, is an example of this type of blower.

From the foregoing it will be apparent that in both embodiments shown the operation depends upon the action of a regulating valve mechanism associated with the blower to vary the volume delivered to the engine. This mechanism is subjected to and controlled by the cooperating influence of the pre-compression pressure and of the surrounding atmospheric pressure whereby the difference between the pressures is kept constant.

Having now described the nature of this invention, what is claimed as new and desired to be secured by Letters Patent of the United States is:

1. In combination with an internal combustion engine, a blower having its delivery pipe connected to all inlet valves of the engine for supplying a gaseous combustion medium under compression to said engine, said blower having rotary impellers with clearances between the impellers and also between the impellers and the blower casing, driving connections between said blower and the engine to cause said blower to be rotated at a speed proportional to the speed of rotation of the engine at any time, and the stroke volume of said blower being so much greater than that of the engine that at all numbers of revolutions of the engine throughout the interval between the maximum and minimum speeds, the output of the blower will be sufficient to maintain the charge delivered to the engine under a pre-compression pressure not lower than the highest permissible pre-compression pressure under which the engine is designed to operate and automatic pressure regulating means comprising a regulating valve associated with said blower to vary the delivery thereof and movable means operatively connected with said valve and subjected on the one side to the atmosphere and on the other side to said pre-compression pressure thereby adjusting said regulating valve so as to maintain the pressure difference between the atmosphere and the pre-compression pressure constant.

2. In combination with an internal combustion engine a blower having its delivery pipe connected to all inlet valves of the engine for supplying a gaseous combustion medium under compression to said engine, said blower being of the type in which the output of the blower is disproportional to its speed, driving connections between said blower and the engine adapted to rotate that blower at a speed proportional to the speed of the engine, the theoretical output per revolution of said blower being so much greater than that of the engine that at all numbers of revolutions of the engine throughout the interval between the maximum and minimum speeds the effective output of the blower will be sufficient to maintain the charge delivered to the engine under a pressure not lower than a predetermined pre-compression pressure, and automatic pressure regulating means comprising a by-pass shunted across said blower, a poppet valve controlling the communication between said delivery pipe and said by-pass, resilient means tending to keep said poppet valve closed against the pressure prevailing in said delivery pipe, and a second poppet valve inserted in the suction conduit of said blower and arranged to open towards said blower, and resilient means tending to keep said second poppet valve closed.

Dated this 6th day of August, 1921.

WALTER SCHWERDTFEGER.